(12) United States Patent
Feitsma et al.

(10) Patent No.: US 12,544,405 B2
(45) Date of Patent: Feb. 10, 2026

(54) FAT COMPOSITION AND NUTRITIONAL COMPOSITION BASED THEREON

(71) Applicant: FrieslandCampina Nederland B.V., Amersfoort (NL)

(72) Inventors: Anouk Leonie Feitsma, Wageningen (NL); William Kloek, Wageningen (NL); Panam Mohit Parikh, Wageningen (NL); Christina Josephina Antonia Maria Timmer-Keetels, Wageningen (NL); Marlotte Marianne Vonk, Wageningen (NL); Prescilla Vera Rombout-Jeurink, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 1212 days.

(21) Appl. No.: 17/431,957

(22) PCT Filed: Feb. 27, 2020

(86) PCT No.: PCT/EP2020/055075
§ 371 (c)(1),
(2) Date: Aug. 18, 2021

(87) PCT Pub. No.: WO2020/178108
PCT Pub. Date: Sep. 10, 2020

(65) Prior Publication Data
US 2022/0143096 A1 May 12, 2022

(30) Foreign Application Priority Data

Mar. 1, 2019 (EP) .................................. 19160187

(51) Int. Cl.
*A61K 35/20* (2006.01)
*A23D 9/00* (2006.01)
(Continued)

(52) U.S. Cl.
CPC ................ *A61K 35/20* (2013.01); *A23D 9/00* (2013.01); *A23L 33/115* (2016.08); *A23L 33/40* (2016.08);
(Continued)

(58) Field of Classification Search
CPC ....... A61K 35/20; A61K 31/23; A23L 33/115; A23L 33/40; A61P 1/14; A23D 9/00; A23V 2002/00
See application file for complete search history.

(56) References Cited

U.S. PATENT DOCUMENTS

2018/0310605 A1  11/2018  Van Der Beek

FOREIGN PATENT DOCUMENTS

| CN | 104705651 | 6/2015 |
| WO | 2009062663 A2 | 5/2009 |

(Continued)

OTHER PUBLICATIONS

Quinlan, P. T., et al.; "The relationship between stool hardness and stool composition in breast- and formula-fed infants"; Journal of Pediatric Gastroenterology and Nutrition; vol. 20, No. 1, 1995; pp. 81-90.

(Continued)

*Primary Examiner* — Erik Kashnikow
*Assistant Examiner* — Assaf Zilbering
(74) *Attorney, Agent, or Firm* — Fitch, Even, Tabin & Flannery LLP

(57) ABSTRACT

The invention relates to a fat composition and a nutritional composition comprising such fat composition. The nutritional composition is particularly suitable for therapeutic applications in treating gut discomfort and/or constipation as well as in non-therapeutic applications for reducing the intestinal formation of calcium and magnesium fatty acid soaps. The fat composition comprises a mixture of tria- (Continued)

Figure 1:
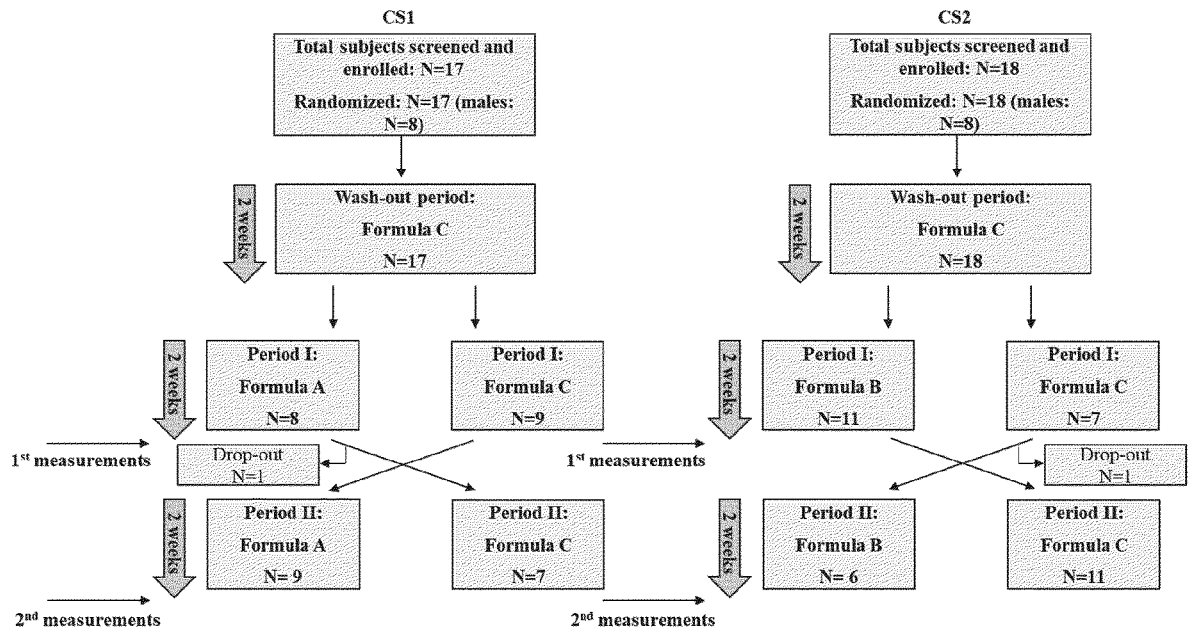

cylglycerols (TAG) originating from a bovine milk fat source and a vegetable lipid source, said mixture being characterized by: (a) a content of butanoate groups (C4:0) of 0.5-2.8% by weight based on total weight of fatty acid acyl groups in TAG; (b) a wLCSFA(sn-1,3) of 18.0-35.0% by weight; (c) a mLCFA (sn-1,3) of 48.0-61.0 mol %; and (d) a ratio mLCFA (sn-1,3)/SFA of 0.70-1.25, wherein: —LCFA (sn-1,3) are the long chain fatty acid acyl groups having a chain length of 12 or more carbon atoms at the sn-1 and sn-3 position in TAG; —LCSFA(sn-1,3) are the long chain saturated fatty acid acyl groups having a chain length of 12 or more carbon atoms at the sn-1 and sn-3 position in TAG; —wLCSFA(sn-1,3) is the amount of LCFA(sn-1,3) in % by weight based on total weight of fatty acid acyl groups in TAG; —mLCFA(sn-1,3) is the mole fraction of LCFA(sn-1,3) based on total moles of fatty acid acyl groups in the TAG as expressed in mol %; and—SFA is the mole fraction of saturated fatty acid acyl groups in the TAG as expressed in mol %.

16 Claims, 2 Drawing Sheets

(51) Int. Cl.
- *A23L 33/00* (2016.01)
- *A23L 33/115* (2016.01)
- *A61K 31/23* (2006.01)
- *A61P 1/14* (2006.01)

(52) U.S. Cl.
CPC ............... *A61K 31/23* (2013.01); *A61P 1/14* (2018.01); *A23V 2002/00* (2013.01)

(56) References Cited

FOREIGN PATENT DOCUMENTS

| WO | 2009062663 A3 | 11/2009 | | |
|---|---|---|---|---|
| WO | 2018024629 | 2/2018 | | |
| WO | WO-2018024629 A1 * | 2/2018 | ............. | A23L 33/12 |

OTHER PUBLICATIONS

Nowacki, Joyce, et al.; "Stool fatty acid soaps, stool consistency and gastrointestinal tolerance in term infants fed infant formulas containing high sn-2 palmitate with or without oligofructose: A double-blind, randomized clinical trial"; Nutrition Journal; 2014, 13:105; http://www.nutritionj.com/content/13/1/105; pp. 1-11.

Bar-Yoseph, Fabiana, et al.; "SN2-palmitate reduces fatty acid excretion in Chinese formula-fed infants"; Journal of Pediatric Gastroenterology and Nutrition; vol. 62, No. 2; Feb. 2016; pp. 341-347.

Hageman, Jeske H. J., et al.; "Comparison of bovine milk fat and vegetable fat for infant formula: Implications for infant health", International Dairy Journal, vol. 92, Jan. 23, 2019, pp. 37-49.

International Search Report and Written Opinion, date of mailing Jun. 3, 2020 International application No. PCT/EP2020/055075 (11 pgs.).

Petit, Valerie et al.; "Importance of the regiospecific distribution of long-chain saturated fatty acids on gut comfort, fat and calcium absorption in infants" Prostaglandins Leukotrienes and Essential Fatty Acid, Churchill Livingston, Edinburgh, vol. 121, Jun. 4, 2017, pp. 40-51.

\* cited by examiner

FAT COMPOSITION AND NUTRITIONAL COMPOSITION BASED THEREON

CROSS REFERENCE TO RELATED APPLICATIONS

This application is a U.S. national phase application of International Application No. PCT/EP2020/055075, filed Feb. 27, 2020, which claims benefit from European Patent Application No. 19160187.1, filed Mar. 1, 2019, which are each hereby incorporated herein by reference in their entirety.

FIELD OF THE INVENTION

The invention relates to a fat composition comprising a mixture of fatty acid triacylglycerols originating from a bovine milk fat source and a vegetable lipid source. The invention further relates to a nutritional composition comprising such fat composition and to the nutritional composition for use in the treatment of gut discomfort and/or constipation. Finally, the invention relates to use of this nutritional composition for reducing the intestinal formation of calcium and magnesium soaps.

BACKGROUND TO THE INVENTION

Nutritional compositions for infants aim to resemble human milk as much as possible, as human milk is generally seen as the ideal source of nutrition for infants up to at least 6 months of age. Although infant formula have become better and better over time, there are still important differences between human milk and infant formula leading to lower fat and calcium absorption in infants fed with infant formula as compared to infants fed with human milk. In addition, infants fed with infant formula more often suffer from gut discomfort and/or even constipation caused by more solid stools and more infrequent bowel movements. This may lead to babies crying more and hence to more anxiety with parents. By contrast, breast-fed infants exhibit frequent and looser/watery stools which, in return, leads to a better gut comfort. These effects of infant formula are generally attributed for a large part to the difference in fat compositions between human milk and infant formula. More specifically, the composition of triacylglycerols (TAG) in infant formula, usually originating from vegetable and/or bovine milk lipid sources, differs from that in human milk.

Nearly all human milk fat consists of TAG that contain saturated and unsaturated fatty acids esterified at the sn-1, sn-2 and sn-3 position of a glycerol molecule. While human milk fat, bovine milk fat and vegetable oils such as palm oil are all rich in palmitic acid (C16:0), the distribution of palmitic acid over the glycerol backbone differs among these different lipid sources. In human milk fat most of the palmitic acid is esterified at the sn-2 position of the glycerol molecule. As a consequence, during the digestion of human milk fat less free palmitic acid is released and hence less insoluble calcium and magnesium palmitic acid soaps are formed in the intestine. Similar effects occur for myristic acid (C14:0) and stearic acid (C18:0). Bovine milk fat and especially vegetable oils, on the other hand, have much higher proportions of palmitic acid esterified at the sn-1 and/or sn-3 positions of the glycerol backbone, resulting in release of more free palmitic acid in the digestive process which, in return, leads to formation of more insoluble palmitic acid soaps in the intestine. These insoluble soaps are excreted with the faeces and cause such faeces to be more solid and harder. Accordingly, infants suffer from harder stools leading to complaints such as abdominal pain, gut discomfort and constipation as often expressed by crying.

It is an object of the present invention to reduce the aforesaid complaints by reducing the excretion of calcium soaps and magnesium soaps and hence ensuring softer stools, thereby reducing gut discomfort and/or constipation.

The formation of calcium soaps also means that less calcium is absorbed in the intestines and hence less calcium from the nutritional composition is available for bone mineralization. Reducing the excretion of calcium, thus increasing the absorption of calcium, therefore is also an object of the present invention.

Likewise, more excretion of palmitic acid soaps means less fat absorption and hence less caloric intake which could in some cases lead to nourishing problems. Reducing palmitic acid soap excretion, or more generally fatty acid soap excretion, thereby increasing overall fat absorption is also an object of the present invention.

In general, it is desired that the absorption of nutrients present in a nutritional composition is as effective as possible and the loss of such nutrients via excretion through faeces is as little as possible. At the same time it is also desired that the fat intake is not too high, as this could lead in due time to overweight with associated health problems.

WO-A-2018/024629 discloses a nutritional composition for infants and young children comprising protein, carbohydrates and TAG. The TAG comprise less than 13.0% by weight of the combined amounts of stearic, palmitic and myristic esters at their sn-1 and sn-3 positions, whilst each of these individual fatty acids is present in a specific amount based on total weight of fatty acids: stearic acid up to 3.6% by weight, palmitic acid up to 11.1% by weight and myristic acid up to 4.6% by weight. The nutritional composition can be used for reducing several complaints, such as reducing digestive discomfort, abdominal pain and/or constipation. The composition is disclosed to be suitable for improving calcium and lipid absorption and for reducing the formation of fatty acid soaps.

SUMMARY OF THE INVENTION

It was found in the present invention that a combination of milk fat from bovine milk and a vegetable lipid source meeting certain specific requirements shows surprisingly beneficial effects in respect of calcium absorption, reduced soap formation and fat absorption when used in nutritional compositions, thereby reducing or eliminating negative side effects such as abdominal pain, gut discomfort and constipation.

DETAILED DESCRIPTION OF THE INVENTION

Accordingly, the present invention relates to a fat composition comprising a mixture of triacylglycerols (TAG) originating from a bovine milk fat source and a vegetable lipid source, said mixture being characterized by:

(a) a content of butanoate groups (C4:0) of 0.5-2.8% by weight, preferably 0.6-2.7% by weight, based on total weight of fatty acid acyl groups in TAG;

(b) a wLCSFA(sn-1,3) of 18.0-35.0% by weight, preferably 19.0 to 32.0% by weight;

(c) a mLCFA (sn-1,3) of 48.0-61.0 mol %, preferably 50.0-59.0 mol %; and (d) a ratio mLCFA (sn-1,3)/SFA of 0.75-1.25, preferably 0.80-1.20, wherein:
- LCFA(sn-1,3) are the long chain fatty acid acyl groups having a chain length of 12 or more carbon atoms at the sn-1 and sn-3 position in TAG;
- LCSFA(sn-1,3) are the long chain saturated fatty acid acyl groups having a chain length of 12 or more carbon atoms at the sn-1 and sn-3 position in TAG;
- wLCSFA(sn-1,3) is the amount of LCFA(sn-1,3) in % by weight based on total weight of fatty acid acyl groups in TAG;
- mLCFA(sn-1,3) is the mole fraction of LCFA(sn-1,3) based on total moles of fatty acid acyl groups in the TAG as expressed in mol %; and
- SFA is the mole fraction of saturated fatty acid acyl groups in the TAG as expressed in mol %.

Preferably, the present invention relates to a fat composition comprising a mixture of fatty acid triacylglycerols (TAG) originating from a bovine milk fat source and a vegetable lipid source, said mixture being characterized by:
(a) a content of butanoate groups (C4:0) of 0.5-2.2% by weight, preferably 0.6-2.0% by weight, based on total weight of fatty acids in TAG;
(b) a wLCSFA(sn-1,3) of 18.0-35.0% by weight, preferably 19.0 to 32.0% by weight;
(c) a mLCFA (sn-1,3) of 48.0-61.0 mol %, preferably 50.0-59.0 mol %; and
(d) a ratio mLCFA (sn-1,3)/SFA of 0.95-1.25, preferably 1.00-1.20, wherein:
- LCFA(sn-1,3) are the long chain fatty acid acyl groups having a chain length of 12 or more carbon atoms at the sn-1 and sn-3 position in TAG;
- LCSFA(sn-1,3) are the long chain saturated fatty acid acyl groups having a chain length of 12 or more carbon atoms at the sn-1 and sn-3 position in TAG;
- wLCSFA(sn-1,3) is the amount of LCFA(sn-1,3) in % by weight based on total weight of fatty acid acyl groups in TAG;
- mLCFA(sn-1,3) is the mole fraction of LCFA(sn-1,3) based on total moles of fatty acid acyl groups in the TAG as expressed in mol %; and
- SFA is the mole fraction of saturated fatty acid acyl groups in the TAG as expressed in mol %.

The butanoate groups present are in fact esterified butyric acid or butanoic acid groups. Butyric acid is a saturated fatty acid with only 4 carbon atoms (denoted as C4:0). It is present in milk fat from bovine origin and absent in vegetable oil. All butanoate groups will be situated at the sn-1 and sn-3 position of the glycerol backbone of the TAG.

Long chain fatty acids (LCFAs) for the purpose of the present invention means fatty acids having 12 or more carbon atoms, while long chain saturated fatty acids (LCSFAs) for the purpose of the present invention means saturated fatty acids having 12 or more carbon atoms. In practice this means all fatty acids having a chain length of from 12 to 20 carbon atoms. Whereas WO-A-2018/024629 discloses a total amount of the LCSFAs myristic acid, palmitic acid and stearic acid at the sn-1,3 positions of up 13.0% by weight, it was found that using a higher amount shows surprisingly beneficial effects. As explained in WO-A-2018/024629, one would expect a higher LCSFA content at the sn-1,3 position (abbreviated as LCSFA(sn-1,3)) to result in more soap formation, as during digestion such LCSFAs may become available as free fatty acids that form insoluble salts with calcium. According to the present invention the amount of LCSFA(sn-1,3) in % by weight based on total weight of TAG (abbreviated as wLCSFA(sn-1,3)) should be in the range of 18.0-35.0% by weight, preferably 19.0 to 32.0% by weight. Most of the LCSFAs present consists of myristic acid, palmitic acid and stearic acid. Accordingly, it was found that total amount of myristic acid, palmitic acid and stearic acid at sn-1,3 should be in the range of 15.0 to 30.0% by weight, preferably 17.0 to 29.0% by weight, based on total weight of fatty acid acyl groups in TAG.

In addition to the weight content of LCSFA(sn-1,3) we found it is also important to specify the mole fraction of LCFA(sn-1,3)—so saturated and unsaturated long chain fatty acids at the sn-1,3 positions-based on total moles of fatty acid acyl groups in the TAG (abbreviated as mLCFA (sn-1,3)). This mole fraction should be in the range of 48.0-61.0 mol %, preferably 50.0-59.0 mol %. The most important unsaturated long chain fatty acids in terms of their content are oleic acid (C18:1) and linoleic acid (C18:2), whilst other long chain unsaturated fatty acids present in smaller amounts are hexadecenoic acid (C16:1), linolenic acid (C18:3) and icosenoic acid (C20:1). Although LCSFA are more prone to contribute to the formation of insoluble soaps (mainly calcium and magnesium soaps), also unsaturated long chain fatty acids contribute to the formation of such insoluble soaps and hence it is relevant to take them into account.

It was found critical to specify how the mole fraction of LCFA(sn-1,3) relates to the total mole fraction of saturated fatty acids (SFA) present in the TAG. The SFA include all fatty acids present in the TAG that are saturated, starting from C4:0 (butyric acid) and generally ranging up to C20:0 (arachidic acid). This variation in chain length of SFA is believed to be relevant, as more variation of length in SFA (as is the case in bovine milk fat) leads to more interactions in fatty acid chains with different lengths. This in return leads to a lower probability of correctly aligned fatty acids and hence lower probability of soap formation (assuming that for soap formation some type of alignment has to take place). Furthermore, the LCFA(sn-1,3) as a fraction of the SFA indicate the relative amount of LCFA that are most readily available for soap formation: the higher the amount of LCFA at the sn-1 and sn-3 positions relative to SFA, the more of these LCFA are available for soap formation, the more soap is potentially formed and excreted, the more gut discomfort and constipation can be expected. Finally, the amount of SFA is important in that high amounts of unsaturated fatty acids could have adverse physiological effects and would increase the risk of oxidation and hence adversely affect taste. It was, accordingly, found that the ratio $$\frac{mLCFA(sn-1,3)}{SFA}$$

is an important parameter for characterizing the fat composition of the invention and should be in the range 0.70-1.25, e.g. 0.75-1.25, preferably 0.80-1.20, more preferably of 0.95-1.25, particularly preferably 1.00-1.20.

This ratio of mLCFA(sn-1,3)/SFA, in combination with the parameters described hereinbefore, was found to be an excellent parameter for controlling the amount of soap formation and hence the calcium absorption and fat absorption. A fat composition having the combination of parameters as described above was found to result in reduced calcium and fat secretion and hence in improved calcium and fat absorption, when used in a nutritional composition, specifically a nutritional composition for human subjects of 0-36 months of age, including infants and young children.

The content of the different fatty acids in the fat composition can be determined by standard method ISO 15884/IDF 182:2002 (Milk fat—Preparation of fatty acid methyl esters) and ISO 15885/IDF 184 (Milk fat—Determination of the fatty acid composition by gas-liquid chromatography). These ISO methods allow for determination of molar concentration of a fatty acid relative to total moles of this fatty acid in TAG ([FA-TAG]). The distribution of fatty acids over the glycerol backbone can be determined according to the method disclosed in Luddy, F. E., Barford, R. A., Herb, S. F., Magidman, P. and Riemenschneider, R. W. *J. Am. Oil Chem. Soc.*, 41, 693-696 (1964). In essence, this method involves hydrolysis of TAG by a sn-1,3 specific pancreatic lipase (porcine). The required 2-monoacylglycerols formed are isolated by thin layer chromatography and these are subsequently methylated for gas chromatographic analysis and quantified in molar concentrations relative to the total moles of fatty acids at the sn-2 position ([FA(sn-2)]). The molar concentration (or mole fraction) of a fatty acid at the sn-1,3 positions of the glycerol backbone relative to total moles of fatty acids in the TAG ([FA(sn-1,3)]) is then calculated from [FA-TAG] and [FA(sn-2)] via the formula:

$$[FA(sn1,3)] = [FA(TAG)] - \tfrac{1}{3}*[FA(sn2)]$$

As described above the fat composition of the present invention comprises a mixture of TAG originating from a milk fat source and a vegetable lipid source.

The fat composition can be prepared by combining the bovine milk fat source(s) with the vegetable lipid source by ways known in the art. Typically, both sources are combined in liquid form, mixed and stored at temperatures at which the blend remains liquid to avoid crystallization and under nitrogen to avoid fat oxidation. Accordingly, the fat composition would typically be stored at 35-50° C. under nitrogen. When further processing the fat composition, e.g. into a nutritional composition as described below, the fat composition would be supplied in liquid form as described above and subsequently be processed by combining it with other ingredients.

The present invention also relates to a nutritional composition comprising proteins, carbohydrates (typically lactose) and a lipid source, wherein the lipid source comprises the fat composition as described above. Optionally, other ingredients, such as oligosaccharides (for example, fructo-oligosaccharides and/or galacto-oligosaccharides) and human milk oligosaccharides (for example, fucosylated oligosaccharides such as 2'-fucosyllactose), may be included as well. Such nutritional composition is particularly suitable for human subjects of 0 to 36 months of age, in particular infants (a person of 0-12 months of age according to the CODEX Alimentarius (CODEX STAN 72-1981), further referred to as the CODEX) and young children up to the age of 36 months. Nutritional compositions for infants are commonly referred to as infant formula. When used as infant formula, the nutritional composition according to the present invention should contain the ingredients in the amounts as prescribed by the CODEX and, if needed, as prescribed by additional regulations of individual countries. Accordingly, the nutritional composition according to the invention for infants comprises the fat composition as described above, protein, carbohydrates, vitamins, minerals and trace elements and the other substances in accordance with the specifications prescribed by the CODEX and, if needed, by additional national regulations.

For the purpose of the present invention the minerals calcium and magnesium are of particular interest as these minerals would usually form insoluble soaps in the intestines with free fatty acids originating from the digestion of the TAG in the stomach. It was surprisingly found that formation of such soaps was significantly reduced, and hence absorption of the minerals and fat increased, when the nutritional composition was formulated such that it has a ratio $$\frac{mLCFA(sn-1,3)*(Ca+Mg)}{SFA}$$

in the range of 0.40 to 0.75 grams per 100 grams of nutritional composition (g/100 g), preferably 0.43 to 0.65 g/100 g, more preferably 0.45 to 0.60 g/100 g, with (Ca+Mg)=concentration of calcium plus concentration of magnesium in the nutritional composition in g/100 g.

Calcium and magnesium content or concentration can be determined using Inductively Coupled Plasma Atomic emission Spectroscopy (ICP-AES). This method is known in the art and is a type of spectroscopy that uses the inductively couple plasma to produce excited atoms and ions that emit electromagnetic radiation at wavelengths characteristic of a particular element. The intensity of this emission is related to the concentration of the element within the sample.

The nutritional composition of the invention can be prepared by conventional methods known in the art. Suitably, the nutritional composition is prepared by the successive steps of:

(a) blending the milk fat source with a whey protein source, such as demineralized whey;
(b) heating the resulting mixture to evaporate part of the water included in such mixture followed by cooling the mixture;
(c) adding minerals and vitamins to the cooled mixture;
(d) pasteurization of the mixture;
(e) adding the vegetable lipid source and homogenizing the mixture;
(f) spray drying the resulting mixture to obtain a base powder; and
(g) if desired, mix dry blend ingredients into the base powder, thus obtaining the nutritional composition in powder form.

Alternatively, when separately preparing the fat composition of the invention as described above, skim milk powder, whey protein concentrate powder and lactose are dissolved in water. To this solution the fat composition (in liquid form, i.e. in molten state) and vitamins and minerals are added, the resulting mixture is pasteurized, homogenized and the mixture is spray dried to obtain the base powder. As in the method described above, dry blend ingredients can be mixed into the base powder, if so desired, thus obtaining the nutritional composition in powder form.

The nutritional composition of the present invention was found to be particularly effective in reducing the intestinal formation of calcium and magnesium soaps and hence increasing calcium absorption.

It is known that calcium fatty acid soaps are associated with constipation and stool hardness in infants. For example, Quinlan et al., *The relationship between stool hardness and stool composition in breast—and formula—fed infants*, J Pediatr Gastroenterol Nutr. 1995, confirms the positive relationship between stool hardness and constipation on the one hand and calcium fatty acid soaps. In Nowacki et al.,

*Stool fatty acid soaps, stool consistency and gastrointestinal tolerance in term infants fed infant formulas containing high sn-2 palmitate with or without oligofructose: A double-blind, randomized clinical trial*, Nutr J. 2014 and in Bar-Yoseph et al., *SN2-palmitate reduces fatty acid excretion in Chinese formula-fed infants*, J Pediatr Gastroenterol Nutr. 2016, a positive relation between sn-2 palmitate in TAG contained in infant formula and reduced formation of calcium fatty acid soaps and associated better stool consistency was described. Hence, reduced calcium fatty acid soap formation and excretion leads to a better stool consistency and less constipation in infants.

The inventors found that the nutritional composition that includes the fat composition of the present invention as described hereinbefore, leads to a surprisingly low excretion of calcium fatty acid soaps, in particular palmitic acid soaps. This, in return, makes the nutritional composition particularly suitable for the therapeutic treatment of gut discomfort and/or constipation in human subjects of 0-36 months of age, suitably young children of 0-12 months of age and most suitably infants of 0-6 months of age. This is, accordingly, also an aspect of the present invention.

The nutritional composition of the present invention could also be suitably used in a non-therapeutic way for reducing the intestinal formation of calcium and magnesium fatty acid soaps, in particular palmitic acid soaps. As explained above this will result in a better stool consistency (i.e. softer stool) and hence will relieve any gut discomfort, abdominal pain and/or constipation in infants and little children. Although the use of the nutritional composition is particularly suitable for infants and little children, the fat composition of the invention could in principle also be beneficially used in nutritional compositions for adults suffering from gut discomfort, abdominal pain and/or constipation.

In one embodiment the fat composition of the invention is used in the treatment of gut discomfort and/or constipation in human subjects of 0-36 months of age, suitably young children of 0-12 months of age and most suitably infants of 0-6 months of age.

In another embodiment the fat composition of the invention could also be applied in the non-therapeutic use for reducing the intestinal formation of calcium and magnesium fatty acid soaps.

EXAMPLES

The invention is further illustrated by the following examples without limiting the scope of the invention to these particular embodiments.

In the examples the following figures will be referred to:

FIG. 1—Study outline and treatment arms per cross-over study

Figure 2:
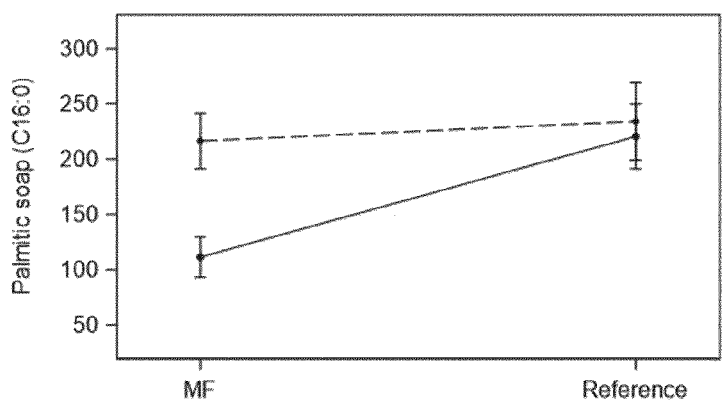

FIG. 2—Palmitic acid soap levels (mg/g dry weight) in stool samples

Figure 3:
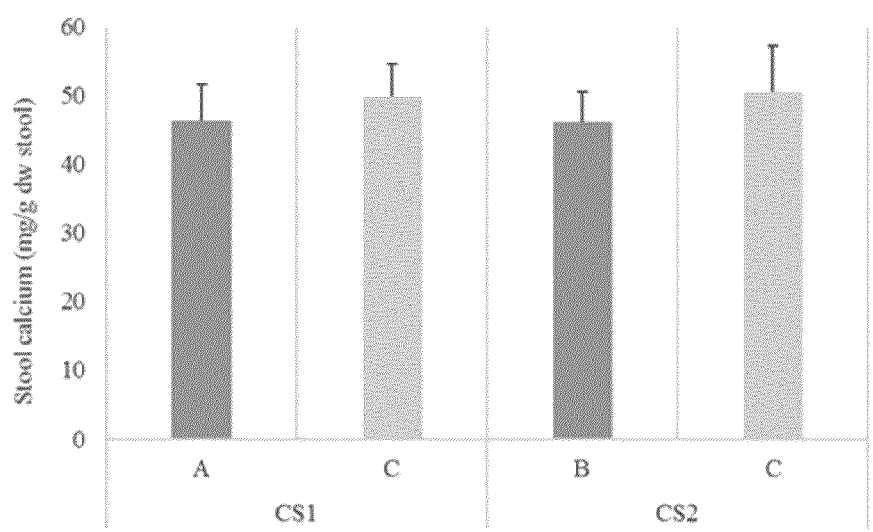

FIG. 3—Calcium levels (mg/g dry weight) in stool samples.

EXAMPLE 1—NUTRITIONAL COMPOSITIONS AND FAT COMPOSITION

Two nutritional compositions for infants illustrating the invention were prepared: Formulation A comprising approximately 50 wt % milk fat based on total fat and Formulation B comprising approximately 20 wt % milk fat based on total fat according to the invention were prepared by blending the milk fat source with demineralized whey and heating the resulting mixture to evaporate part of the water included in such mixture followed by cooling the mixture. Minerals and vitamins were added to the cooled mixture and this mixture was pasteurized. Subsequently a vegetable fat blend was added and the mixture was homogenized and spray dried to obtain a base powder, to which dry blend ingredients were added to obtain the Formulations A and B.

The bovine milk fat sources used for Formulation A were cream and whole milk, the milk fat source used to prepare Formulation B was a mixture of whole milk and skimmed milk.

The other ingredients were added in such amounts resulting in the Formulations A and B having a composition as indicated in Table 1.

Reference Formulation C (only vegetable oil used; small amount of milk fat originates form the demineralized whey used) was prepared in the same way as Formulations A and B except that no bovine milk fat source was used, but skimmed milk was used instead in the first blending step.

The composition of Formulation C is also indicated in Table 1.

The fatty acid compositions present in each of the Formulations are indicated Table 2, whilst key parameters for each Formulation are summarized in Table 3.

TABLE 1

Formulation compositions

| Nutrient | | A | B | C |
|---|---|---|---|---|
| Casein (N × 6.25) | g/100 g | 3.8 | 4.2 | 4.4 |
| Whey Protein (N × 6.25) | g/100 g | 6.6 | 6.4 | 6.4 |
| Carbohydrates | g/100 g | 53.6 | 52.9 | 52.9 |
| Lactose | g/100 g | 47.5 | 46.8 | 47.4 |
| Fat | g/100 g | 27.3 | 27.4 | 27.3 |
| Milk fat | g/100 g | 13.8 | 5.5 | 0.5 |
| Minerals | mg/100 g | 2.3 | 2.5 | 2.5 |
| Calcium | mg/100 g | 412 | 426 | 430 |
| Magnesium | mg/100 g | 49 | 49 | 49 |
| Sodium | mg/100 g | 154 | 173 | 180 |
| Phosphorus | mg/100 g | 223 | 234 | 238 |
| Potassium | mg/100 g | 549 | 610 | 614 |
| Chloride | mg/100 g | 302 | 359 | 360 |
| Galacto-oligosaccharides | g/100 g | 3.1 | 3.1 | 3.1 |
| Sphingomyelin | mg/100 g | 53 | 42 | 36 |
| Cholesterol | mg/100 g | 47 | 29 | 19 |
| Phospholipids | mg/100 g | 204 | 164 | 145 |
| Vitamins | mg/100 g | 156 | 143 | 144 |
| Choline | mg/100 g | 161 | 160 | 159 |
| Inositol | mg/100 g | 55 | 54 | 34 |
| L-carnitine | mg/100 g | 23 | 22 | 12 |

TABLE 2

Fatty acid compositions

| | Formulation A | | | | | Formulation B | | | | | Formulation C | | | | |
|---|---|---|---|---|---|---|---|---|---|---|---|---|---|---|---|
| | TAG | | sn-2 | sn-1 + sn-3 | | TAG | | sn-2 | sn-1 + sn-3 | | TAG | | sn-2 | sn-1 + sn-3 | |
| | wt % | mol % | mol % | wt % | mol % | wt % | mol % | mol % | wt % | mol % | wt % | mol % | mol % | wt % | mol % |
| C4:0 | 1.9 | 5.2 | 0.0 | 1.9 | 5.2 | 0.7 | 2.1 | 0.0 | 0.7 | 2.1 | 0.0 | 0.0 | 0.0 | 0.0 | 0.0 |
| C6:0 | 1.1 | 2.4 | 0.0 | 1.2 | 2.4 | 0.5 | 1.1 | 0.0 | 0.5 | 1.1 | 0.0 | 0.0 | 0.0 | 0.0 | 0.0 |
| C8:0 | 1.2 | 2.1 | 0.1 | 1.2 | 2.0 | 0.8 | 1.4 | 0.1 | 0.8 | 1.3 | 0.8 | 1.5 | 0.0 | 0.8 | 1.5 |
| C10:0 | 1.9 | 2.7 | 0.7 | 1.4 | 2.0 | 1.1 | 1.5 | 0.4 | 0.8 | 1.1 | 0.7 | 1.1 | 0.2 | 0.6 | 0.9 |
| C12:0 | 5.2 | 6.3 | 4.0 | 1.9 | 2.3 | 6.7 | 8.6 | 4.0 | 3.7 | 4.6 | 8.8 | 11.5 | 5.2 | 4.9 | 6.3 |
| C14:0 | 6.9 | 7.5 | 4.4 | 2.9 | 3.1 | 4.4 | 4.9 | 2.5 | 2.2 | 2.4 | 3.6 | 4.1 | 1.7 | 2.1 | 2.4 |
| C16:0 | 18.9 | 18.1 | 7.4 | 11.4 | 10.7 | 25.7 | 25.6 | 5.1 | 20.9 | 20.5 | 24.6 | 25.0 | 2.5 | 22.4 | 22.5 |
| C16:1 | 0.9 | 0.9 | 0.5 | 0.5 | 0.4 | 0.5 | 0.5 | 0.2 | 0.3 | 0.3 | 0.2 | 0.2 | 0.1 | 0.1 | 0.1 |
| C18:0 | 5.6 | 4.8 | 0.8 | 4.8 | 4.0 | 4.6 | 4.1 | 0.5 | 4.0 | 3.6 | 3.7 | 3.3 | 0.2 | 3.4 | 3.1 |
| C18:1 | 37.9 | 33.1 | 9.8 | 27.2 | 23.3 | 39.0 | 35.3 | 14.1 | 23.8 | 21.2 | 40.2 | 37.0 | 15.9 | 23.0 | 21.1 |
| C18:2 | 12.2 | 10.7 | 4.3 | 7.4 | 6.4 | 11.2 | 10.2 | 5.4 | 5.3 | 4.8 | 13.3 | 12.4 | 6.6 | 6.3 | 5.8 |
| C18:3 | 1.4 | 1.3 | 0.7 | 0.7 | 0.6 | 1.5 | 1.4 | 0.7 | 0.7 | 0.7 | 1.7 | 1.6 | 1.5 | 0.8 | 0.1 |
| C20:0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| C20:1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

TABLE 3

Key parameters

| Formulation | A | B | C |
|---|---|---|---|
| C4:0 (wt %) | 1.9 | 0.7 | 0.0 |
| wLCSFA(sn-1,3) | 21.0 | 30.8 | 32.8 |
| mLCFA(sn-1,3) | 50.8 | 58.1 | 61.4 |
| SFA | 49.1 | 49.3 | 46.5 |
| mLCFA(sn-1,3)/SFA | 1.03 | 1.18 | 1.32 |
| (Ca + Mg) (g/100 g) | 0.46 | 0.48 | 0.48 |
| (Ca + Mg)*mLCFA(sn-1,3)/SFA | 0.47 | 0.56 | 0.63 |

EXAMPLE 2—SOAP FORMATION

To investigate the beneficial effect of milk fat in infant formula on formation of fatty acid soaps and calcium excretion, the following trial was conducted with Formulations A, B and C of Example 1: two double-blind randomized placebo-controlled cross-over trials were conducted in parallel in healthy term infants screened between the 9$^{th}$ and 14$^{th}$ week of age. All subjects were exclusively fed with Formulations A and C or with Formulations B and C and received the control Formulation C for two weeks (wash-out period) prior to the start of Period I. The set-up of the trial is schematically depicted in FIG. 1.

As depicted in FIG. 1 cross-over study 1 (CS1) enrolled 17 subjects that were randomly allocated to a two-week trial (period I) with either Formulation A (50 wt % milk fat formula) or Formulation C (vegetable fat control formula). After two weeks, all infants were crossed-over to the other formula for another two-week trial (period II). In cross-over study 2 (CS2), a similar approach was conducted with 18 enrolled subjects fed with either Formulation B (20 wt % milk fat formula) or Formulation C (vegetable fat control formula). At the end of period I and period II, fecal samples were collected to assess excretion of palmitic acid soaps and calcium. The results are shown in FIGS. 2 and 3.

As shown in FIG. 2, both CS1 and CS2 showed reduced levels of palmitic acid soap (mg/g dry weight) in stool samples of infants fed with milk fat-based Formula A and B as compared with vegetable fat-based Formula C.

As shown in FIG. 3, both CS1 and CS2 showed that the stool samples of the infants fed with milk fat containing Formulations A and B showed reduced levels of calcium (mg/g dry weight) as compared with the stool samples obtained from the infants fed with essentially milk fat-free Formulation C.

The results of the trial show that infant formula containing a fat composition with a fatty acid distribution that is characterized by a certain content of butanoate groups (C4:0) and a specific distribution of long chain fatty acids over the glycerol backbone, particularly saturated long chain fatty acids, reduces the formation of palmitic acid soaps and the excretion of calcium in stool samples. As a result, it can be expected that infants will have less gut discomfort and constipation which contributes to their wellbeing.

The invention claimed is:

1. A fat composition comprising a mixture of triacylglycerols (TAG) originating from a bovine milk fat source and a vegetable lipid source, said mixture comprising:
   (a) a content of butanoate groups (C4:0) of 0.5-2.8% by weight, based on total weight of fatty acid acyl groups in TAG;
   (b) a wLCSFA(sn-1,3) of 18.0-35.0% by weight;
   (c) a mLCFA (sn-1,3) of 48.0-61.0 mol %, preferably 50.0-59.0 mol %; and
   (d) a ratio mLCFA (sn-1,3)/SFA of 0.70-1.25,
   wherein:
      LCFA(sn-1,3) are the long chain fatty acid acyl groups having a chain length of 12 or more carbon atoms at the sn-1 and sn-3 position in TAG;
      LCSFA(sn-1,3) are the long chain saturated fatty acid acyl groups having a chain length of 12 or more carbon atoms at the sn-1 and sn-3 position in TAG;
      wLCSFA(sn-1,3) is the amount of LCSFA(sn-1,3) in % by weight based on total weight of fatty acid acyl groups in TAG;
      mLCFA(sn-1,3) is the mole fraction of LCFA(sn-1,3) based on total moles of fatty acid acyl groups in the TAG as expressed in mol %; and
      SFA is the mole fraction of saturated fatty acid acyl groups in the TAG as expressed in mol %.

2. The fat composition according to claim 1, wherein:
   the content of butanoate groups (C4:0) is 0.5-2.2% by weight, based on total weight of fatty acid acyl groups in TAG, and
   the ratio mLCFA (sn-1,3)/SFA is 0.95-1.25.

3. The fat composition according to claim 1 comprising 10-60 wt %, based on total weight of TAG, of TAG originating from the bovine milk fat source.

4. The fat composition according to claim 3, wherein the bovine milk fat source is whole milk and/or cream.

5. A nutritional composition comprising proteins, carbohydrates and a lipid source, wherein the lipid source comprises the fat composition according to claim 1.

6. The nutritional composition according to claim 5, wherein the nutritional composition has a ratio $$\frac{mLCFA(sn-1,3)*(Ca+Mg)}{SFA}$$

in the range of 0.40 to 0.75 grams per 100 grams of nutritional composition (g/100 g), wherein (Ca+Mg) is a concentration of calcium plus a concentration of magnesium in the nutritional composition in g/100 g.

7. A method of treating gut discomfort and/or constipation in a subject, the method comprising administering to the subject an effective amount of the nutritional composition of claim 5, wherein the subject is a human subject of 0-36 months of age.

8. A method of reducing intestinal formation of calcium and magnesium fatty acid soaps in a subject, the method comprising administering to the subject an effective amount of the nutritional composition of claim 5.

9. A method of treating gut discomfort and/or constipation in a subject, the method comprising administering to the subject an effective amount of the fat composition of claim 1, wherein the subject is a human subject of 0-36 months of age.

10. A method of reducing intestinal formation of calcium and magnesium fatty acid soaps in a subject, the method comprising administering to the subject an effective amount of the fat composition of claim 1.

11. The fat composition according to claim 1, wherein the content of butanoate groups (C4:0) in the mixture is 0.6-2.7% by weight, based on total weight of fatty acid acyl groups in TAG.

12. The fat composition according to claim 1, wherein the content of butanoate groups (C4:0) in the mixture is 0.6-2.0% by weight, based on total weight of fatty acid acyl groups in TAG.

13. The fat composition according to claim 1, wherein the wLCSFA (sn-1,3) of the mixture is 19.0-32.0% by weight.

14. The fat composition according to claim 1, wherein the mLCFA (sn-1,3) of the mixture is 50.0-59.0 mol %.

15. The fat composition according to claim 1, wherein the ratio mLCFA (sn-1,3)/SFA is 0.80-1.20.

16. The fat composition according to claim 1, wherein the ratio mLCFA (sn-1,3)/SFA is 1.00-1.20.

* * * * *